(12) United States Patent
Mestre et al.

(10) Patent No.: US 11,379,849 B2
(45) Date of Patent: Jul. 5, 2022

(54) SECURITY FOR CONTACTLESS TRANSACTIONS

(71) Applicant: MASTERCARD INTERNATIONAL INCORPORATED, Purchase, NY (US)

(72) Inventors: Patrick Mestre, Sart-Bernard (BE); Patrik Smets, Nijlen (BE); Eddy Van De Velde, Leuven (BE); Duncan Garrett, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 281 days.

(21) Appl. No.: 16/811,727

(22) Filed: Mar. 6, 2020

(65) Prior Publication Data
US 2020/0286085 A1  Sep. 10, 2020

(30) Foreign Application Priority Data

Mar. 7, 2019 (GB) .................................... 1903099
Dec. 16, 2019 (GB) .................................... 1918485

(51) Int. Cl.
G06Q 20/40 (2012.01)
G06Q 20/34 (2012.01)
(Continued)

(52) U.S. Cl.
CPC ..... *G06Q 20/40975* (2013.01); *G06Q 20/341* (2013.01); *G06Q 20/352* (2013.01);
(Continued)

(58) Field of Classification Search
CPC ........... G06Q 20/40975; G06Q 20/341; G06Q 20/352; G06Q 20/3823; G06Q 20/3827;
(Continued)

(56) References Cited

U.S. PATENT DOCUMENTS 9,990,632 B1  6/2018 Koeppel et al.
2004/0124246 A1  7/2004 Allen et al.
(Continued)

FOREIGN PATENT DOCUMENTS

WO  2018000275 A1  1/2018

OTHER PUBLICATIONS

Final Office Action issued in U.S. Appl. No. 16/811,843, dated Nov. 29, 2021, 13 pages.
(Continued)

*Primary Examiner* — James D Nigh
(74) *Attorney, Agent, or Firm* — Talem IP Law, LLP

(57) ABSTRACT

A method of performing a contactless transaction between a payment device and a terminal is described. The method comprises establishing a data connection between the payment device and the terminal and then establishing if the payment device and the terminal both support an enhanced security architecture. If they do not, they will then perform the contactless transaction according to a basic transaction flow using a first cryptographic system. If they do, they will perform the contactless transaction according to an enhanced transaction flow using a second cryptographic system. The first cryptographic system and the second cryptographic system comprise different asymmetric cryptographic systems. Suitable payment devices and terminals, and methods at the payment devices and terminals, are described.

20 Claims, 7 Drawing Sheets

(51) Int. Cl.
  *G06Q 20/38* (2012.01)
  *H04L 9/06* (2006.01)
  *H04L 9/08* (2006.01)

(52) U.S. Cl.
  CPC ..... *G06Q 20/3823* (2013.01); *G06Q 20/3827* (2013.01); *G06Q 20/3829* (2013.01); *H04L 9/0643* (2013.01); *H04L 9/0825* (2013.01); *H04L 9/0844* (2013.01)

(58) Field of Classification Search
  CPC . G06Q 20/3829; H04L 9/0643; H04L 9/0825; H04L 9/0844
  USPC .......................................................... 705/75
  See application file for complete search history.

(56) References Cited

U.S. PATENT DOCUMENTS

| | | | |
|---|---|---|---|
| 2010/0275011 A1 | 10/2010 | Horgan et al. | |
| 2012/0144193 A1 | 6/2012 | Le Saint et al. | |
| 2015/0106616 A1* | 4/2015 | Nix | H04W 52/0277 713/170 |
| 2015/0121086 A1* | 4/2015 | Smith | G06F 21/556 713/189 |
| 2015/0134469 A1 | 5/2015 | White et al. | |
| 2015/0143125 A1* | 5/2015 | Nix | H04W 12/04 713/171 |
| 2016/0292676 A1* | 10/2016 | French | G06Q 20/3278 |
| 2017/0091727 A1 | 3/2017 | Richards et al. | |
| 2017/0255922 A1 | 9/2017 | Jin et al. | |
| 2017/0308895 A1 | 10/2017 | Srivastava et al. | |
| 2018/0181947 A1* | 6/2018 | Roberts | G06F 21/14 |
| 2018/0205538 A1 | 7/2018 | Le Saint | |
| 2018/0268408 A1 | 9/2018 | Botros et al. | |
| 2019/0164158 A1 | 5/2019 | Koeppel et al. | |
| 2019/0354980 A1 | 11/2019 | Li et al. | |
| 2020/0160131 A1 | 5/2020 | Waga | |
| 2020/0167775 A1* | 5/2020 | Reese | G06Q 20/38215 |
| 2022/0019995 A1 | 1/2022 | Ngo et al. | |

OTHER PUBLICATIONS

"International Search Report and Written Opinion Issued in PCT Application No. PCT/US2020/021311", dated Jun. 29, 2020, 12 Pages.

"International Search Report and Written Opinion Issued in PCT Application No. PCT/US2020/021312", dated Jun. 30, 2020, 11 Pages.

Notice of Allowance issued in U.S. Appl. No. 16/811,843, dated Feb. 28, 2022, 10 pages.

* cited by examiner

SECURITY FOR CONTACTLESS TRANSACTIONS

TECHNICAL FIELD

This disclosure relates to security for contactless transactions. It relates to developments in contactless readers and payment devices adapted to perform contactless transactions, and to corresponding transaction flow.

BACKGROUND

Payment cards such as credit cards and debit cards are very widely used for all forms of financial transaction. The use of payment cards has evolved significantly with technological developments over recent years. Many payments are made at a retail location, typically with a physical transaction card interacting with a point of sale (POS) terminal to perform a transaction. These transaction cards may interact with a POS by swiping through a magnetic stripe reader, or for a "chip card" or "smart card" by direct contact with a smart card reader (under standard ISO/IEC 7816) or by contactless interaction through local short range wireless communication (under standard ISO/IEC 14443).

In Europe, contactless cards generally operate under the EMV standard for interoperation of chip cards and associated apparatus provided and maintained by EMVCo. The current EMV Contactless Specifications for Payment Systems are available from https://www.emvco.com/specifications.aspx?id=21.

It is desirable to enhance existing specifications to improve effectiveness for all parties associated with a transaction system. Particular areas where enhancements are desirable are in security. It is desirable to achieve solutions which allow multiple benefits to be obtained and which allow existing solutions to be adapted without extensive modification.

BRIEF SUMMARY

In a first aspect, the disclosure provides a method at a payment device of performing a contactless transaction with a terminal, the method comprising: establishing a data connection with the terminal; establishing if the payment device and the terminal both support an enhanced security architecture; and if not, performing the contactless transaction according to a basic transaction flow using a first cryptographic system; but if so, performing the contactless transaction according to an enhanced transaction flow using a second cryptographic system; wherein the first cryptographic system and the second cryptographic system comprise different asymmetric cryptographic systems.

More generally, using this approach it is possible to provide a contactless transaction architecture adapted to support two different security architectures and each architecture is associated with its own transaction flow. These transaction flows may have different capabilities. In embodiments, the first cryptographic system comprises RSA cryptography whereas the second cryptographic system comprises ECC cryptography.

In embodiments, certificates may be used which are adapted for both security architectures—this may allow a simple transition to use of a second security architecture when there is the capability to do so. In such a case, the payment device may provide the terminal with a certificate for both the public keys of both the first cryptographic system and the second cryptographic system asymmetric cryptographic systems.

In embodiments, the contactless transaction is performed according to EMV protocols.

In embodiments, the second cryptographic system may further comprise use of AES as a symmetric cryptographic system. The enhanced transaction flow may use AES session keys. In one arrangement, the enhanced transaction flow uses a first AES confidentiality session key for establishing a confidential channel between the payment device and the terminal and a AES integrity session key for establishing data integrity.

In embodiments, in the enhanced transaction flow the payment device receives a terminal public key from the terminal, and provides a payment device public key with a blinding factor to the terminal to establish a shared secret using a blinded Diffie-Hellman key exchange.

In certain embodiments, in the enhanced transaction flow the payment device receives a command to generate an application cryptogram for the transaction. The payment device may then use an AES symmetric key to compute the application cryptogram. The payment device may also provide the computed application cryptogram and additional transaction related data in a data envelope protected by a Message Authentication Code using an AES integrity session key. Cardholder verification choices may be received from the terminal with the command to generate an application cryptogram, with the payment device providing a selected cardholder verification choice with the application cryptogram.

In a second aspect, the disclosure provides a method at a terminal of performing a contactless transaction with a payment device, the method comprising: establishing a data connection with the payment device; establishing if the payment device and the terminal both support an enhanced security architecture; and if not, performing the contactless transaction according to a basic transaction flow using a first cryptographic system; but if so, performing the contactless transaction according to an enhanced transaction flow using a second cryptographic system; wherein the first cryptographic system and the second cryptographic system comprise different asymmetric cryptographic systems.

The first cryptographic system may comprise RSA cryptography whereas the second cryptographic system comprises ECC cryptography.

In embodiments, the contactless transaction is performed according to EMV protocols.

The second cryptographic system may comprise use of AES as a symmetric cryptographic system. The enhanced transaction flow may then use AES session keys, and specifically may use a first AES session key for establishing a confidential channel between the payment device and the terminal and a second AES session key for establishing data integrity.

In embodiments, in the enhanced transaction flow the terminal provides a terminal public key to the payment device, and then receives from the payment device a payment device public key with a blinding factor to establish a shared secret using a blinded Diffie-Hellman key exchange.

In embodiments, in the enhanced transaction flow the terminal commands the payment device to generate an application cryptogram for the transaction. The terminal may then receive from the payment device the computed application cryptogram and additional transaction related data in a data envelope protected by a Message Authentication Code using the AES integrity session key. In embodiments, the terminal provides cardholder verification choices with the command to provide an application cryptogram, and receives from the payment device a selected cardholder verification choice with the application cryptogram.

In a third aspect, the disclosure provides a payment device adapted to perform a contactless transaction with a terminal, wherein the payment device is adapted to: establish a data connection with the terminal; establish if the payment device and the terminal both support an enhanced security architecture; and if not, to perform the contactless transaction according to a basic transaction flow using a first cryptographic system; but if so, to perform the contactless transaction according to an enhanced transaction flow using a second cryptographic system; wherein the first cryptographic system and the second cryptographic system comprise different asymmetric cryptographic systems.

This payment device may be a passive device, such as a payment card.

In a fourth aspect, a contactless reader programmed to perform the method of the third aspect may also be provided.

BRIEF DESCRIPTION OF THE DRAWINGS

Specific embodiments of the disclosure will be described below by way of example, with reference to the accompanying Figures, of which.

DETAILED DESCRIPTION

Figure 1:
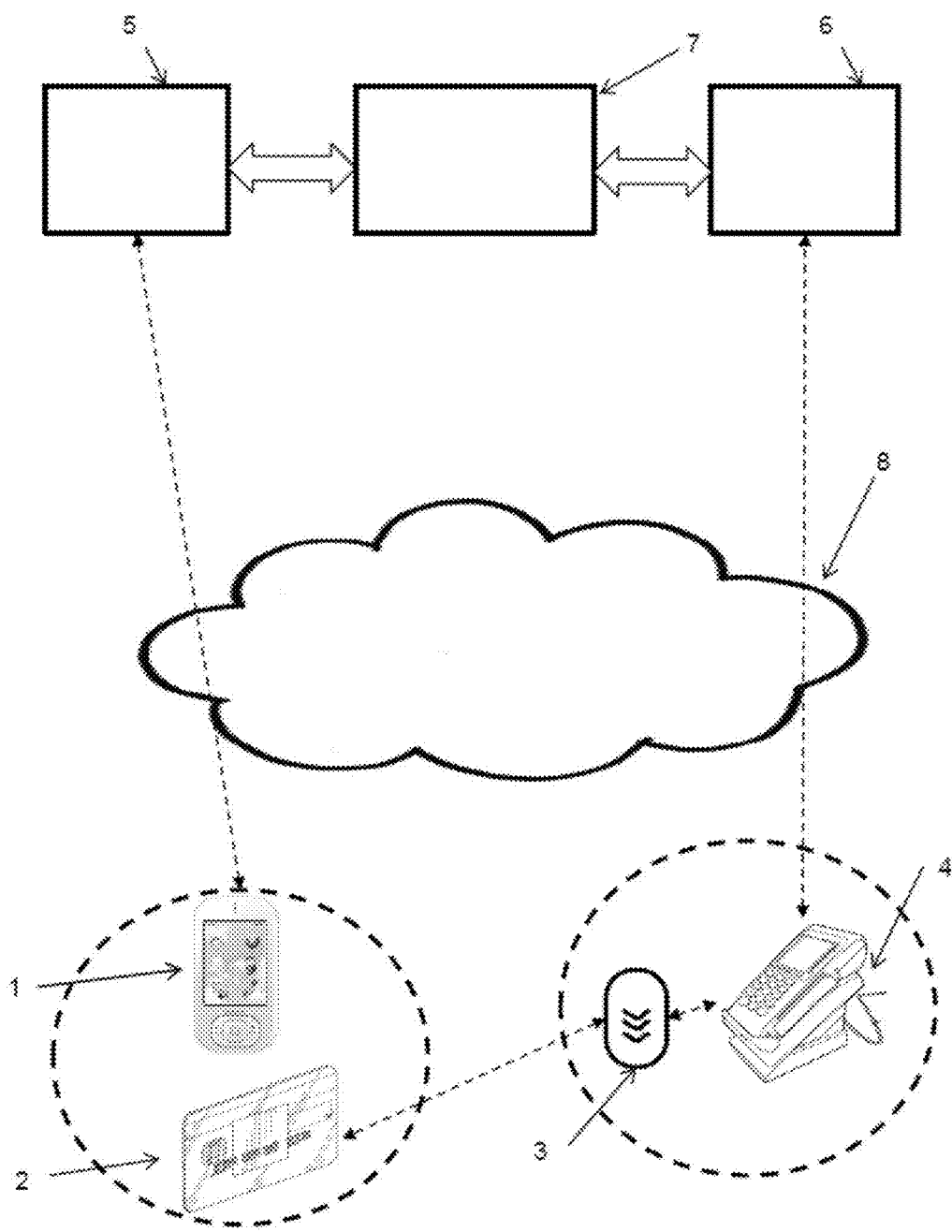
FIG. 1 shows schematically relevant parts of a representative transaction system suitable for implementing an embodiment of the disclosure.

FIG. 1 shows schematically relevant parts of a representative transaction system suitable for implementing embodiments of the disclosure.

A user (not shown) is provided with a payment device—this may be for example a payment card 2, but in particular embodiments it may be another form of payment device. Embodiments described here relate primarily to passive devices which typically lack their own power source and respond instead to activation in a powered interaction with a reader. A payment card is the most well-established form of such a device, but wearable devices such as rings or clothing are increasingly commonly used. A mechanism is here shown—mobile phone 1—to allow the user to interact with other elements of the system over a suitable network 8. The network 8 here represents any appropriate communication network for the communication path indicated, and may be the public internet, a cellular communications network or a private network, depending on the parties involved in the communication and the need for the communication path to be secure.

The payment device is adapted to use a contactless protocol for communication with a point of interaction (POI) terminal such as a point of sale (POS) terminal or an automated teller machine (ATM). The payment card 2 must therefore include a chip and a wireless transmitter and receiver adapted for short range communication by protocols such as those defined under ISO/IEC 14443—if used as a payment device. The payment card 2 also contains an EMV chip with a payment application installed, together with user credentials and all information and cryptographic material necessary to instantiate an EMV transaction. The terminal 4 must be provided with a reader 3 for contactless transactions, the terminal 4 and the reader 3 together providing in this case a POS system for a merchant. The operation of this system is described further below with reference to FIG. 2.

There is in the arrangement shown a mechanism in the form of mobile phone 1 to allow connection between the user computer devices and a card issuing bank 5 or system associated with the user. A banking infrastructure 7 will also connect the card issuing bank 5 and the merchant's transaction acquiring bank 6, allowing transactions to be carried out between them. This banking infrastructure will typically be provided by a transaction card provider who provides transaction card services to the card issuing bank 5. The banking infrastructure 7 provides authorization at the time of purchase, clearing of the transaction and reconciliation typically within the same working day, and settlement of payments shortly after that. The banking infrastructure 7 comprises a plurality of switches, servers and databases, and is not described further here as the details of the banking infrastructure used are not necessary for understanding how embodiments of the disclosure function and may be implemented.

Figure 2:
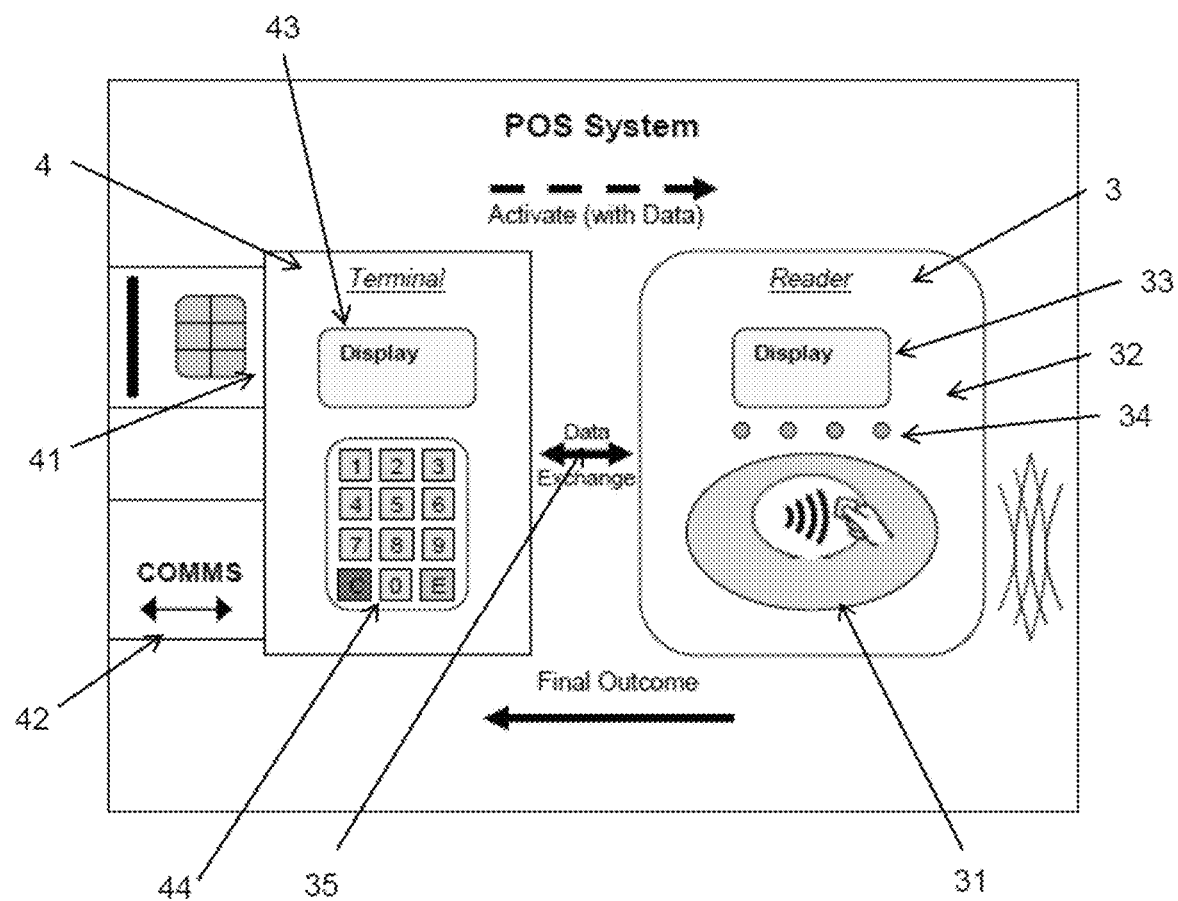
FIG. 2 illustrates the interaction between a contactless reader and a terminal.

The elements of a contactless transaction will now be described with reference to FIG. 2, which illustrates the interaction between the reader 3 and the terminal 4—the payment device is not explicitly shown. The reader 3 comprises a wireless communication interface 31 for wireless communication with the payment device, and a cardholder side user interface 32 including here a reader display 33 and signal lights 34. The reader also has a data communication path 35 to the terminal 4—this may be a wired connection or a wireless communication over a suitable local communication network (preferably secured to prevent effective eavesdropping). The terminal 4 is here a conventional POS terminal augmented by ability to communicate with the reader 3—it therefore comprises a reader interface 41 for interacting with other payment device types by contact (chip cards, magnetic stripes), a communication interface 42 for communicating directly or indirectly with a merchant's acquiring bank, and a user interface including a display 43 and a keypad 44 for use by merchant or customer as appropriate to the transaction.

A contactless transaction may be initiated by the merchant at the terminal 4 or by a payment device coming into range of the wireless communication interface 31 if a transaction is expected. The terminal 4 provides the reader 3 with sufficient details of the transaction and of the terminal to allow a transaction to take place between the two. The transaction follows protocols set out in the EMV Contactless Specifications for Payment Systems. The transaction amount is displayed to the customer on the reader display 33. The reader 3 provides sufficient information to the payment device to identify the transaction and the merchant and to provide confidence to the cardholder that the transaction is legitimate. The payment device provides sufficient information to identify the relevant cardholder account to the merchant, and to allow the merchant to the transaction with the merchant's acquiring bank (this may be considered to be a payment token provided by the payment device to indicate the user's commitment to the transaction)—online authorization may or may not be required during the transaction, depending on factors such as the size of the transaction. Included in this information provided by the payment device is verification information. The reader 3 determines a final outcome for the transaction, which is then communicated to the terminal 4.

Figure 3:
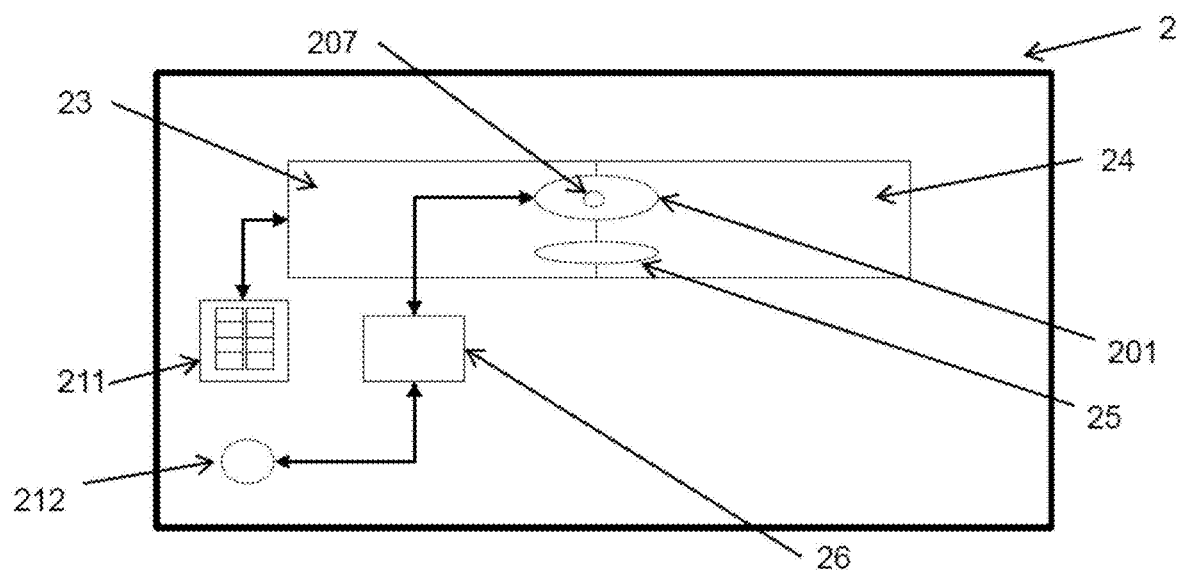
FIG. 3 shows in schematic form a payment card adapted for use as a payment device in embodiments of the disclosure.

FIG. 3 illustrates the functional features of a payment card 2 for use in embodiments of the disclosure in more detail. As indicated above, embodiments of the disclosure may be used with other payment devices, but the embodiment described in detail below relates to a payment card 2 with limited cryptographic capability.

FIG. 3 shows schematically relevant parts of a representative hardware and software architecture for a transaction card such as a payment card 2 (particularly an EMV payment card) suitable for implementing an embodiment of the disclosure. The payment card 2 comprises an application processor 23, one or more memories 24 associated with the application processor and a NFC controller 26. The payment card 2 is equipped with a contact pad 211 for contact transactions using contact card protocols such as ISO/IEC 7816 and also comprises an antenna 212 connected to NFC controller 26 to allow transactions under contactless card protocols such as those defined under ISO/IEC 14443.

The payment card 2 is capable of cryptographic processing, though its capabilities may be limited given the card form factor. In this embodiment, this is shown as a cryptographic processing function 25 provided within the application processor 23 and associated memories 24, but this can be implemented by a physically separated element (which is physically and/or logically protected from tampering or subversion) or may be incorporated within the main processing area but logically protected from subversion. In the embodiment described below, the cryptographic processing function 25 possesses at least one private and public key pair used to identify the card the private key is unique to the card and its corresponding public key is certified by the card issuing bank 5. A corresponding card issuer public key may be certified by or on behalf of the provider of the transaction infrastructure 7, establishing a full chain of trust for the transaction infrastructure—this can be verified by the terminal 4 possessing the transaction infrastructure public key. The cryptographic processing function may hold several cryptographic key pairs and can perform cryptographic operations such as calculations to establish a session key.

Figure 4:
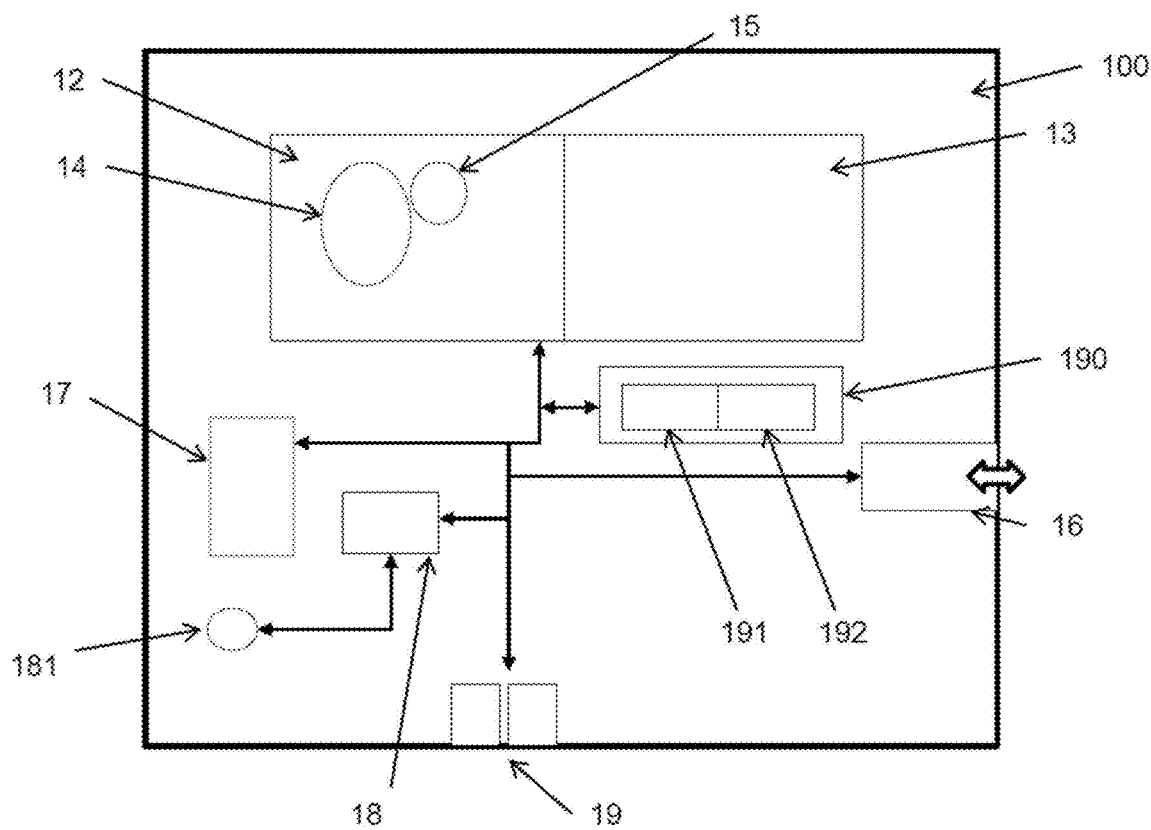
FIG. 4 shows in schematic form a terminal adapted for use in embodiments of the disclosure.

FIG. 4 illustrates the functional features at the point of interaction for use in embodiments of the disclosure in more detail—in this connection, features of both the contactless reader 3 and the terminal 4 will be considered, and "terminal" used as a general term to describe this overall functionality. The terminal 100 has at least one processor 13 and associated memories 12. The base function of the terminal in the case shown is to operate as a point of interaction (POI) with a financial system—such a terminal may be a point of sale (POS) terminal or an automated teller machine (ATM) for example. In other embodiments, the terminal may have another function altogether (for example, a security system terminal for evaluating user credentials). In the case shown, the terminal 100 has an operating system 14 and transaction software 15 (these may be provided together in a single assemblage of code, or may both be divided into a number of different components, but are represented here as two elements for convenience). The operating system 14 manages hardware resources and provides common services for applications, whereas the transaction software 15 performs the base function of the terminal and may be provided (for example) as one or more applications. The terminal 100 will generally have a protected channel 16 to another party such as an acquiring bank (this may, for example, be effected over a public network by use of encryption)—embodiments of the disclosure have particular value in situations where this protected channel 16 is only sporadically available to the terminal 100. The terminal 100 will also have means to make a connection to a device such as a transaction card. In this case, the terminal has contactless reader functionality 17 and an NFC controller 18 and antenna 181 to allow a contactless card connection to a contactless card, or a device such as an NFC-enabled mobile telephone able to act as a proxy for a contactless card. The terminal 100 may have additional ports 19 to allow data to be provided to it from other sources (for example, by USB stick). Transactions may be established through the contact card reader functionality 17 or through the NFC controller 18, or indeed any other appropriate local connection.

The terminal 100 has capability to carry out cryptographic operations, including the generation of new key pairs. While (as noted above with reference to the discussion of the transaction card) this can in principle be provided inside or outside the main operating environment, this is provided here by a secure module 190 within the terminal containing a cryptographic processor 191 and a memory 192. As with the card, the terminal may have a private and public key pair to identify it (and may have a similar chain of trust ending with the transaction infrastructure provider), but it is also capable of generating new public and private keys, and in particular ephemeral key pairs for use in terminal sessions.

Figure 5:
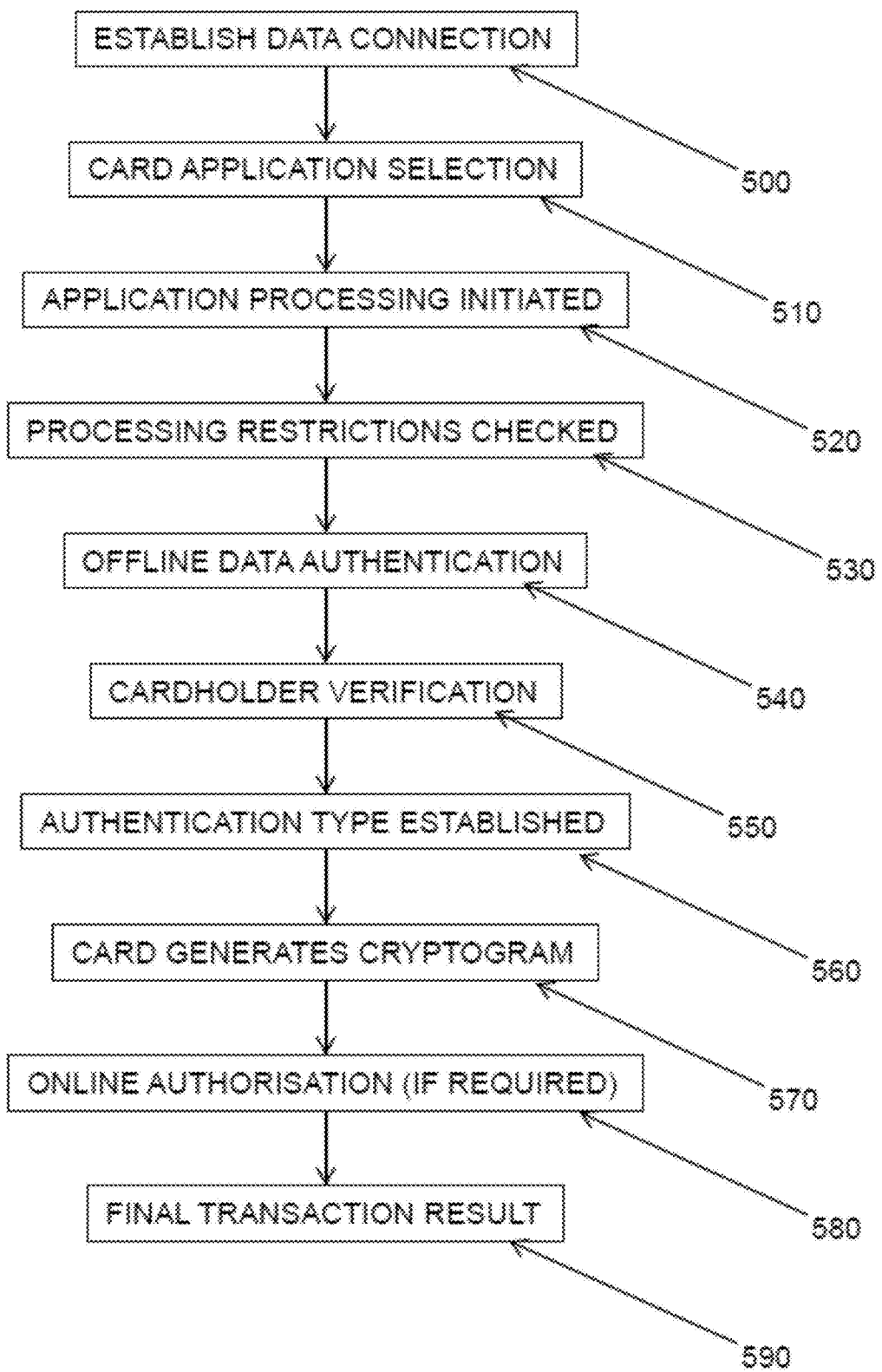
FIG. 5 shows a generic form of a transaction interaction between the payment card of FIG. 3 and the terminal of FIG. 4 in the payment infrastructure of FIG. 1.

The steps in a typical session between a payment card 2 and a terminal 100 are illustrated in FIG. 5—these steps are typical for a transaction implementing EMV protocols and do not define the present disclosure, but rather provide a context in which embodiments of the disclosure may be used and against which modifications provided by embodiments of the disclosure should be considered.

The first step is to establish a data connection 500 between the card 2 and the terminal 100—this may be through contacts ("chip-and-PIN") in which case interaction protocols are governed by ISO/IEC 7816, or contactless through short range wireless communication, in which case interaction protocols are governed by ISO/IEC 14443. A suitable application (there may be multiple applications present) on the card 2 is selected 510 for the transaction and application processing initiated 520 with the terminal 100 providing required data to the card, and the card providing data relevant to its state. The terminal 100 checks 530 for any processing restrictions from the card data. Offline data authentication using public key cryptography is then used to validate 540 the card with this cryptographic capability and also to establish a secure channel between the card 2 and the terminal 100. Cardholder verification 550 (for example, through PIN entry at the terminal for a contact card) may then take place to evaluate whether the person controlling the card is the legitimate cardholder. The terminal may then evaluate whether online authorization is needed, and provides 560 the result of its action to the card. The card then generates 570 a cryptogram (the type of cryptogram depending on the authorization type result provided by the terminal)

and sends it to the terminal. If online authorization is needed, the cryptogram is sent together with transaction data through the transaction infrastructure to the issuer for authorization 580, with an authorization result (possibly also providing data returned from the issuer for the card) returned to the terminal 100, leading to ultimate acceptance or refusal of the transaction 590.

General principles of EMV processing are familiar to the skilled person, and for technical detail of existing implementations the person skilled in the art would refer to the EMV technical specifications, for example as provided at https://www.emvco.com/document-search/. Embodiments described below relate to the provision of Enhanced Processing as an alternative to conventional EMV processing in contactless transactions. Such conventional implementations follow existing EMV contactless specifications (in Book C-2 of the EMV protocols—this may be referred to below as C2 Processing). Enhanced Processing allows for greater technical capability in cards and readers than may have been available in earlier implementations, allowing in particular for a new security architecture based on ECC rather than RSA for public key cryptography, along with use of AES for symmetric encryption and also a number of new functional elements.

Figure 6:
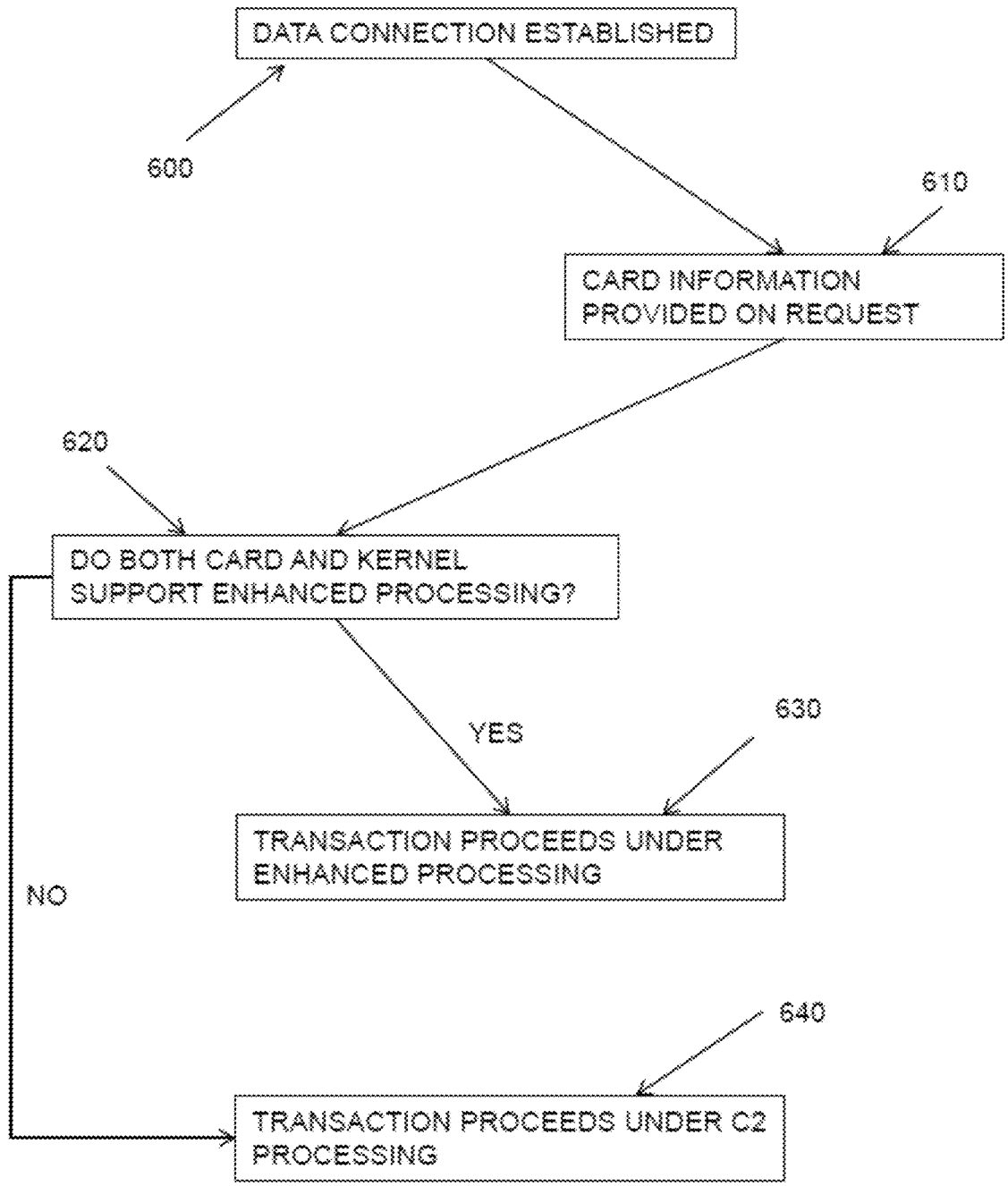
FIG. 6 shows a process for establishing whether enhanced processing is to be used according to an embodiment of the disclosure.

A procedure to determine whether a contactless transaction will take place according to conventional C2 Processing or Enhanced Processing is shown in FIG. 6. After a data connection is established 600 between the reader and the card, the reader requests the card to provide 610 information which includes File Control Information Issuer Discretionary Data—this may include a Card Qualifier field that indicates whether the card supports Enhanced Processing (in embodiments, this may be indicated by a non-zero "version" field). The kernel of the terminal transaction processing software (hereafter "the Kernel") may itself support or not support Enhanced Processing (or indeed C2 Processing)—this is indicated in Kernel Configuration, which already has the role of indicating whether mag-stripe mode and EMV mode contactless transactions are supported. If the Kernel determines 620 that Enhanced Processing is supported by both the Kernel and the card, the transaction proceeds according to an Enhanced Processing transaction flow 630—otherwise it will proceed according to conventional C2 Processing 640.

One primary purpose for adoption and use of Enhanced Processing rather than C2 Processing is upgrading of the security architecture. C2 Processing uses RSA for public key cryptography, based on public and private RSA key pairs held by the card and the terminal. Enhanced Processing uses Elliptic Curve Cryptography (ECC) rather than RSA, which is considered technically superior. For symmetric encryption (for example, in the creation of session keys), C2 Processing solutions have generally used 3DES as an algorithm. 3DES is now generally considered to be superseded by AES as a symmetric cryptographic system. Enhanced Processing is able to use AES throughout, using 3DES only where it is necessary for legacy reasons.

The same approach as shown here could of course be used for a further migration from ECC to another base cryptographic technology.

Figure 7:
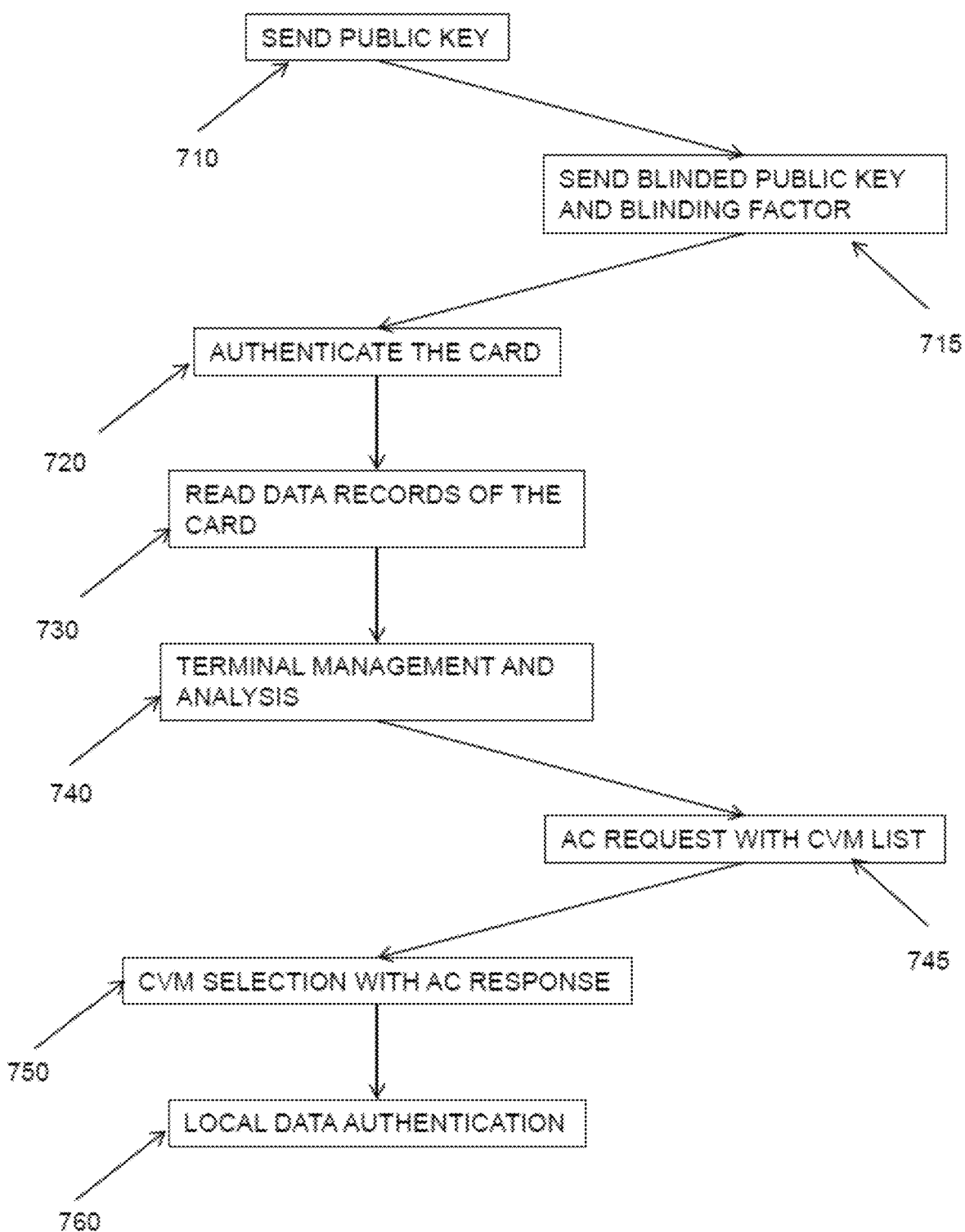
FIG. 7 shows a transaction flow for enhanced processing according to an embodiment of the disclosure.

A general indication of Enhanced Processing flow is shown in FIG. 7. Once it is determined that the Enhanced Processing has been selected (as it will be if it can be performed by both card and terminal), the Kernel performs the following steps (where not further described, names in capital letters refer to EMV commands described in existing EMV technical specifications):

1. The Kernel sends 710 a public key to the card in the GET PROCESSING OPTIONS command data. Using its private key and a blinding factor, the card generates a shared secret and from that a set of session keys. In the GET PROCESSING OPTIONS response 715, the card sends its blinded public key and the encrypted blinding factor so that the Kernel can compute the same shared secret and session keys. The blinding factor permits the Kernel to authenticate 720 the card (in conjunction with the card certificates).

2. The Kernel reads 730 the data records of the card (using READ RECORD commands). Any record data returned by the card that uniquely identifies it (for example the Application PAN), has been encrypted by the card using one of the session keys and the AES block cipher.

3. The Kernel performs 740 Terminal Risk Management and Terminal Action Analysis.

4. The Kernel requests 745 an Application Cryptogram from the card by issuing a GENERATE AC command. The Kernel offers up to the card in the GENERATE AC command data a list of the CVMs that it supports for the transaction and the card picks one from that list. The card informs 750 the Kernel of its choice in the response to the GENERATE AC command.

5. The Kernel performs 760 LDA (Local Data Authentication) by the verification of an AES CMAC (Cipher-based Message Authentication Code) calculated using one of the session keys. The session key is authenticated by validating the certificates and the blinding factor.

These features will now be described in more detail, with particular reference to the security architecture and cryptographic processes used where these go beyond what is conventionally employed in C2 Processing.

As indicated previously, this architecture is based on use of elliptic curve cryptography (ECC) rather than using RSA cryptography as for C2 processing. This requires both card and terminal to have their own ECC public and private key pair. These may be provisioned originally, or key pairs may be generated using this approach, which follows ISO/IEC 15946-1.

The private key d for a given elliptic curve E with base point G of order n consists of a positive integer d, satisfying $1<d<n-1$.

The corresponding public key point is $P=dG$ on the curve E.

Given an elliptic curve, all parameters including the base point are fixed. Therefore, key generation consists solely of random or pseudorandom generation of d and subsequent computation of the public key point $P=dG$ and thereby its x-coordinate representation.

In embodiments described here, public keys are represented using only their x-coordinate. For any non-zero point $(x,y)$ on the curve, $(x,-y)$ will also be on the curve. The signature verification is sensitive to the value of the y-coordinate. For this reason, the card ECC key must be generated in such a way as to ensure that the verifier can determine the correct value of the y-coordinate of the Public Key from knowledge of only the x-coordinate.

This can be achieved if the keys used for signing are generated to ensure that the y-coordinate as an integer modulo p is less than $(p+1)/2$. This enables the terminal to generate the correct y-coordinate given the correct x-coordinate.

Two approaches to achieve this are described below—the first approach involves more computation, but the second approach may require additional logic.

Approach 1: Repeatedly generate a random non-negative integer d satisfying 1<d<n−1—until the y-coordinate of dG is less than (p+1)/2.

Approach 2: Generate a random non-negative integer d' satisfying 1<d<n−1 and if the y-coordinate of d'G is less than (p+1)/2 then d:=d' else set d:=n−d'.

The public key is then calculated to be the point P=dG and its representation is the x-coordinate of P.

Even if an ECC pair has originally been provisioned, or if an ECC pair has been generated, it may be desirable to allow provisioning of a new ECC pair to the card or terminal if required, or to require a new ECC pair to be generated in appropriate circumstances.

Various possibilities are available for elliptic curves, but NIST P-256 is a standard choice. The NIST P-256 curve is used as specified in Table 4 below.

TABLE 1

Parameters of NIST P-256 Curve

| Parameter | Value |
|---|---|
| p = | $2^{256} - 2^{224} + 2^{192} + 2^{96} - 1 =$ 115 79208 92103 56248 76269 74469 49407 57353 00861 43415 29031 41955 33631 30886 70978 53951 FFFFFFFF 00000001 00000000 00000000 00000000 FFFFFFFF FFFFFFFF FFFFFFFF |
| n = | 115 79208 92103 56248 76269 74469 49407 57352 99969 55224 13576 03424 22259 06106 85120 44369 FFFFFFFF 00000000 FFFFFFFF FFFFFFFF BCE6FAAD A7179E84 F3B9CAC2 FC632551 |
| a = | FFFFFFFF 00000001 00000000 00000000 00000000 FFFFFFFF FFFFFFFF FFFFFFFC |
| b = | 5AC635D8 AA3A93E7 B3EBBD55 769886BC 651D06B0 CC53B0F6 3BCE3C3E 27D2604B |
| $G_x$ = | 6B17D1F2 E12C4247 F8BCE6E5 63A440F2 77037D81 2DEB33A0 F4A13945 D898C296 |
| $G_y$ = | 4FE342E2 FE1A7F9B 8EE7EB4A 7C0F9E16 2BCE3357 6B315ECE CBB64068 37BF51F5 |

The card (and terminal) may provide their public key in the form of a public key certificate from a trusted certificate issuer. In embodiments, a common certificate may be used to provide both RSA and ECC public keys, as then the same certificate or certificates could be provided under both C2 Processing and Enhanced Processing.

To verify that a key is a point on the curve, the following approach can be taken.

```
Let x be the x coordinate of the key, y be the y
coordinate of the key and a, b and p be the
curve parameters:
IF y^2 = x^3 + ax + b mod p
THEN
  the key is valid
ELSE
  the key is not valid
ENDIF
```

The use of blinding factors in generation of a shared key is discussed in, for example, the applicant's earlier application EP3273635A1 entitled "Secure Channel Establishment". One approach to calculating a blinding factor is as follows:

Blinded ECC Public Key=(Blinding Factor*card ECC Private Key mod $n$)·G, where x·Y denotes the scalar multiplication by x of the point of the curve Y.

The parameters n and G are given above, with the Blinded ECC Public Key in Card Key Data being the x coordinate.

Session keys are determined once a shared secret is established between the card and the kernel. This approach may be realised as follows:

First, compute Shared Secret as follows:

Shared Secret:=(Blinding Factor*ICC ECC Private Key mod $n$)·Kernel Key Data, where x·Y denotes the scalar multiplication by x of the point of the curve Y, with the parameter n given above. The term "ICC" (Integrated Circuit Card) is often used for reference to the card in EMV contexts.

Then compute a key KDK from Shared Secret as follows:

Z:=x coordinate of Shared Secret as a 256 bit value

Apply CMAC to Z using an AES key of 128 bits of 0b to give the 128 bit result KDK Derive the Session Key for Confidentiality by AES enciphering the following data block with key KDK.

Data Block='01'|'01'|'00'|'54334A325957773D'|'A5A5A5' | '0180'

Derive the Session Key for Integrity by AES enciphering the following data block with key KDK.

Data Block='02'|'01'|'00'|'54334A325957773D'|'A5A5A5'| '0180'

The other cryptographic element required by the card for EMV processes is a dynamic number—ICC Dynamic Number. This may be obtained as follows:

IF 'Session Key Derivation' in Application Control=AES

THEN Compute the ICC Dynamic Number using the ICC Dynamic Number Master Key as follows:

ICC Dynamic Number := AES(MKIDN)[R] , where

R = ATC |'00'|'00'|'00'|'00'|'00'|'00'|'00'|'00'|'00'|'00'|'00'|'00'|'00'|'00'.

ELSE

Compute the ICC Dynamic Number using the ICC Dynamic Number Master Key as follows:

```
ICC Dynamic Number := (IDNL | IDNR)
Where:
   IDNL := DES3(MKIDN)[(ATC | 'FF' | '00' | '00' | '00' | '00' | '00')]
   IDNR := DES3(MKIDN)[(ATC | '00' | '00' | '00' | '00' | '00' | '00')]
ENDIF
```

At this point, the security architecture for communication between the card and the terminal has been established. As noted in step 730 shown in FIG. 7, information is exchanged between card and terminal with encryption used where the information is sensitive. For example, the card may provide, and so encrypt, sensitive data in the following circumstances:

Encryption of the Blinding Factor in the response to the GET PROCESSING OPTIONS command, Encryption of the records in the response to the READ RECORD command, and Encryption of Data Envelope in the response to the READ DATA command, and may need to decrypt it in the following circumstances:

Decryption of the Data Envelopes in the WRITE DATA command.

Appropriate processes are as follows.

Encryption—This function uses the Message Counter DK, the Session Key for Confidentiality and an Input Message. The Input Message is denoted P and the Output Message denoted C. The Input Message is encrypted as described below—this is the Counter (CTR) mode as described in [ISO/IEC 10116].

1. Generate a Starting Variable (SV) by concatenating 14 bytes of zeros onto the Message Counter DK as follows:
   SV:=Message Counter DK|'000000000000000000000000000000'

2. If Input Message P is not a multiple of 16-bytes then pad by appending r (0<r<16) zero-bytes to Input Message.

Note: This padding is only specified to simplify the specification in the case that the message is not a multiple of 16-bytes and is not functionally necessary as any padding bytes are subsequently discarded.

3. Partition P into B 16-byte blocks:
   P*:=P1|P2| . . . |PB

4. Encrypt the plaintext thus:
   $C_i = P_i \oplus$ AES(Session Key for Confidentiality)[SV+(i−1)]
   for $1 \leq i \leq B$ Where AES(K)[D] means Encrypt 16 byte block D with key K using AES in ECB mode.

5. If padding was applied then truncate the final rightmost r-bytes from CB thereby creating the plaintext:
   C:=C1|C2| . . . |CB 6. Return ciphertext C.

Decryption—Similarly, this function uses the Message Counter KD, the Session Key for Confidentiality and an Input Message. The Input Message is denoted C and the Output Message denoted P. The Input Message is decrypted as described below which is as before the Counter (CTR) mode as described in [ISO/IEC 10116].

1. Generate a Starting Variable (SV) by concatenating 14 bytes of zeros onto the Message Counter KD as follows:
   SV:=Message Counter KD|'000000000000000000000000000000'

2. If Input Message C is not a multiple of 16-bytes then pad by appending r (0<r<16) zero-bytes to Input Message.

Note: This padding is only specified to simplify the specification in the case that the message is not a multiple of 16-bytes and is not functionally necessary as any padding bytes are subsequently discarded.

3. Partition C into B 16-byte blocks:
   C*:=C1|C2| . . . |CB

4. Decrypt the ciphertext thus:
   $P_i = C_i \oplus$ AES(Session Key for Confidentiality)[SV+(i−1)]
   for $1 \leq i \leq B$ Where AES(K)[D] means Encrypt 16 byte block D with key K using AES in ECB mode.

5. If padding was applied then truncate the final rightmost r-bytes from PB thereby creating the plaintext:
   P:=P1|P2| . . . |PB 6. Return plaintext P.

The Kernel performs Terminal Risk Management and Terminal Action Analysis—both of these are features of standard EMV transactions, relating to determination of whether authorization should take place online or could be approved (or rejected) offline. Terminal Risk Management results here in Terminal Risk Management Data according to Table 2 below—this is an exemplary approach, with many fields reserved for future updates (RFU) to preserve flexibility.

TABLE 2

Exemplary Terminal Risk Management Data options
Terminal Risk Management Data

| | | |
|---|---|---|
| Byte 1 | 8 | Restart Supported |
| | 7 | Enciphered PIN verified online (Contactless) |
| | 6 | Signature (paper) (Contactless) |
| | 5 | Enciphered PIN verification performed by ICC (Contactless) |
| | 4 | No CVM required (Contactless) |
| | 3 | CDCVM (Contactless) |
| | 2 | Plaintext PIN verification performed by ICC (Contactless) |
| | 1 | Present and Hold supported |
| Byte 2 | 8 | CVM Limit exceeded |
| | 7 | Enciphered PIN verified online (Contact) |
| | 6 | Signature (paper) (Contact) |
| | 5 | Enciphered PIN verification performed by ICC (Contact) |
| | 4 | No CVM required (Contact) |
| | 3 | CDCVM (Contact) |
| | 2 | Plaintext PIN verification performed by ICC (Contact) |
| | 1 | RFU |
| Byte 3 | 8 | Mag-stripe mode contactless transactions not supported |
| | 7 | EMV mode contactless transactions not supported |
| | 6-1 | RFU |
| Byte 4 | 8 | CDCVM bypass requested |
| | 7 | SCA exempt |
| | 6-1 | RFU |
| Byte 5 | 8-1 | RFU |
| Byte 6 | 8-1 | RFU |
| Byte 7 | 8-1 | RFU |
| Byte 8 | 8-1 | RFU |

After this, the Kernel requests 745 an Application Cryptogram from the card by issuing a GENERATE AC command. A session key will be derived for generating the AC—there are a variety of possible processes for this (a proprietary process is possible here, for example, or a 3DES key), but an AES AC session key may be derived as follows:

AC Session Key:=AES(AC Master Key)[ATC] '000000000000000000000000000000'] Where AES(K)[D] means Encrypt 16 byte block D with key K using AES in ECB mode.

Figure 8:
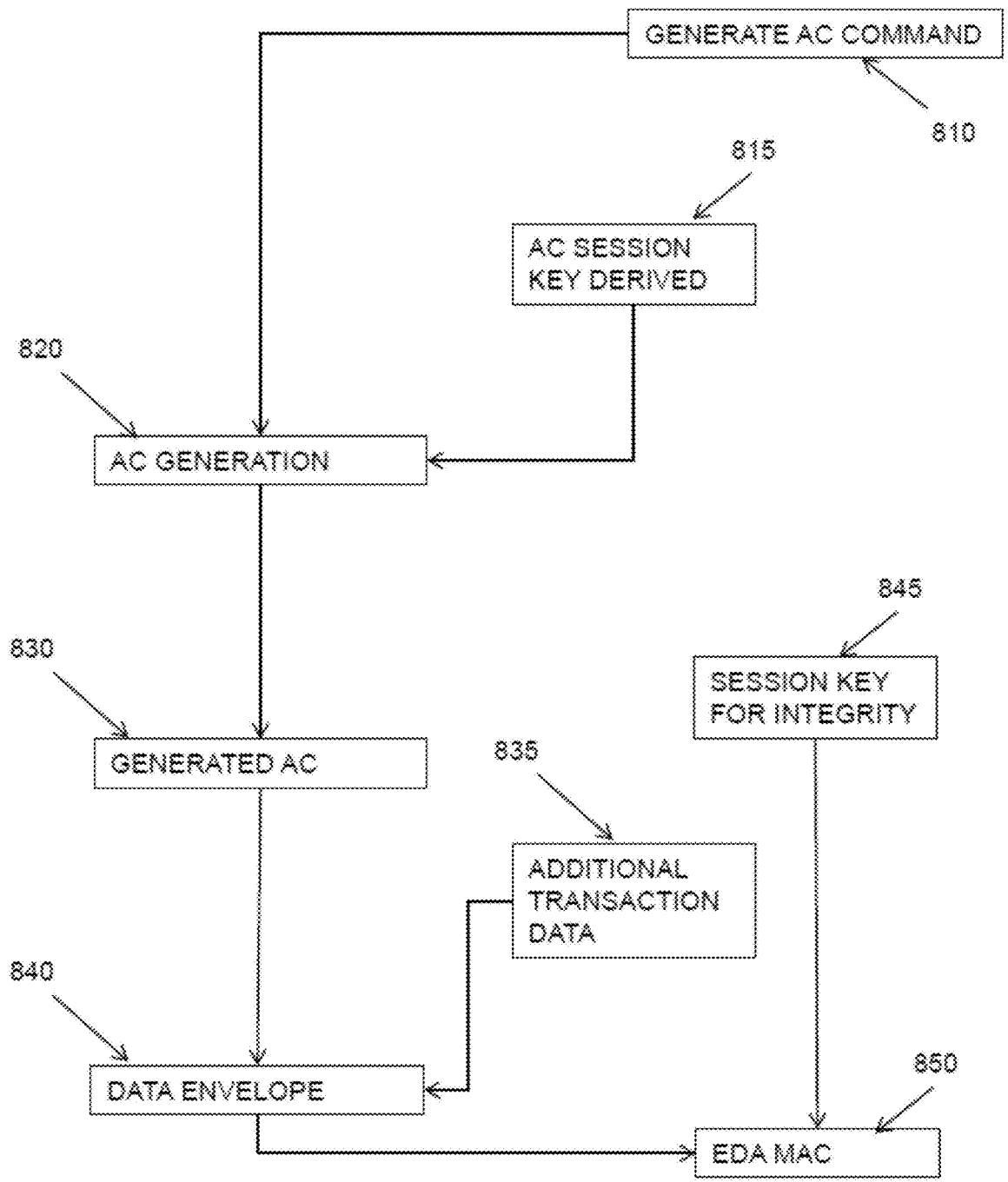
FIG. 8 illustrates use of session keys in application cryptogram generation according to an embodiment of the disclosure.

The process of AC generation is shown in more detail in FIG. 8 with reference to session key use. In response to a GENERATE AC command 810, an AC is generated 820 using an AC Session Key as an input 815. If the session key is an AES key ('Session Key Derivation' in Application Control is AES, the AC may be computed as follows:

The AES MAC algorithm is CMAC (as defined in EMV v4.3 Book 2 section A.1.2.2) with input message D, Kmac key AC Session Key, and where the value of s is 8.

CMAC may be computed as follows (and is in existing EMV contexts).

The computation of an s-byte MAC ($4 \leq s \leq 16$) is according to [ISO/IEC 9797-1] Algorithm 5 (CMAC) using a 128-bit (16-byte) block cipher algorithm (AES) in CBC mode and k-bit key Kmac where k=128, 192, or 256. More precisely, the computation of a MAC S over a message D consisting of an arbitrary number of bytes with a MAC Session Key Kmac takes place in the following steps.

Padding and Blocking

If the length of the message D is a multiple of 16 bytes, then no padding is added.

If the length of the message D is not a multiple of 16 bytes, then add a mandatory '80' padding byte to the right of D, and then add the smallest number of '00' bytes (possibly none) to the right such that the length of the resulting message:

D:=(D|'80'|'00'|'00'| . . . '00')

is a multiple of 16 bytes.

D is then divided into 16-byte blocks X1, X2, . . . , XB:

D:=(X1|X2| . . . |XB).

MAC Session Key

The MAC Session Key Kmac consists of a k-bit block.

In accordance with [ISO/IEC 9797-1] Algorithm 5 (CMAC), two k-bit masking keys K1mac and K2mac are also derived.

Let Z be 16 bytes set to zero and let C be equal to Z except with its rightmost bits set to 10000111b (C is a CMAC-defined constant for a 16-byte block cipher).

L:=AES(Kmac)[Z]
K1mac=L<<1. If msb(L)=1 then K1mac:=K1mac⊕C
K2mac=K1mac<<1. If msb(K1mac)=1 then K2mac:=K2mac⊕C where the following notation is used:

<<1–left-shift 1 bit (i.e. the new k-bit string comprises the k–1 rightmost bits of the old string appended with a zero bit)

msb—the most significant bit (i.e. the leftmost bit).

MAC Computation

Mask the final block with masking key K1mac if no padding was added:

XB:=XB⊕K1mac and with masking key K2mac if padding was added:

XB:=XB⊕K2mac.

Process the 16-byte blocks X1, X2, . . . , XB with the block cipher in CBC mode using the MAC Session Key Kmac:

Hi:=AES(Kmac)[Xi⊕Hi−1], for i=1, 2, . . . , B with initial value H0 of 16 bytes set to 0x00.

The MAC S is then equal to the s leftmost (i.e. the most significant) bytes of HB, where Application Cryptogram:=S Once the Application Cryptogram is created 830, it can be used along with other data 835 associated with the transaction to provide authentication of further details of the transaction and its processing—this is termed Enhanced Data Authentication. A data envelope is provided 840 to contain this information (such as the Application Transaction Counter and other data such as PDOL values which indicate processing options taken and CDOL1 Related Data providing details of the transaction) and for this an Enhanced Data Authentication Message Authentication Code—EDA MAC—is generated 850. The MAC is computed using 845 the Session Key for Integrity as derived above. The MAC may be computed as follows:

1. Compute AES-CMAC of ('0000' input to the EDA MAC) using the Session Key for Integrity and where CMAC is defined in [ISO/IEC 9797-1] as MAC Algorithm 5.

2. The EDA MAC is the most significant 8 bytes of the AES-CMAC.

After the generation of the Application Cryptogram, the Kernel can therefore perform Local Data Authentication by the verification of an AES CMAC (Cipher-based Message Authentication Code) calculated using a session key as described above. The session key is then authenticated by validating the certificates and the blinding factor.

Embodiments of Enhanced Processing either explicitly provide for, or enable, a number of properties not found in C2 Processing. Where not already discussed above, these are discussed below.

Privacy Protection

Use of the security architecture described here preserves privacy by ensuring that anyone eavesdropping on the communications between a payment device and a contact-less reader cannot tell the identity of the payment device (card) that performed the transaction and cannot tell from the payment application data if two transactions performed at the same terminal were performed by the same or different cards or payment applications.

This is achieved by using an Elliptic Curve (EC) Blinded Diffie Hellman (BDH) mechanism to establish shared symmetric keys between card and terminal. Using this approach allows one key to be established for privacy protection, with another key established for authentication of the card. This makes it possible to use the established symmetric key to provide a message authentication code (MAC) for the transaction. From the properties of the BDH mechanism—the BDH value is a random multiple of the card public key—it is possible to establish that this came from the genuine card. This provides a much faster signature process, offsetting time cost in the initial BDH processing.

Customer Verification Mechanism

The cardholder verification mechanism (CVM) may be processed differently in Enhanced Processing. The choice may be made by the card from a set of mechanisms identified by the reader as acceptable. This allows the reader to determine what CVM mechanisms would be acceptable in the circumstances (for example, the amount of the transaction), while allowing the card to determine the choice to be made in the most effective way. The transaction may be declined on failure. There is also a possibility for the card to change certain bits in the Terminal Verification Results, in particular to support use of Online PIN—this may for example be done if the CVM choice is provided with the Application Cryptogram, in which case Terminal Verification Results may need to be changed to match.

Extended SDA Tag list

In existing EMV specifications, there is an "SDA tag list" provided of card data to be certified by the issuer. Enhanced Processing can provide for an Extended SDA tag list allowing for a wider range of data to be certified by the issuer—not just an Application Interchange Profile (AIP) as in earlier EMV processing. This is particularly useful in signing PDOL (data objects requested by the card) and the application identifier for the payment application (and business rule) actually used by the card.

AES and Data Storage

Enhanced Processing can support an additional data storage mechanism (Data Storage—DS). This provides a symmetric key mechanism to protect the transfer of data storage envelopes to enable non-payment data to be protected for privacy and data integrity. Effectively this reuses the symmetric keys established for the privacy protection of the payment data to store and read this data—specifically this uses the Session Key for Integrity as described above in connection with the READ DATA and WRITE DATA commands to provide a MAC over a message (this may be for example the most significant 8 bytes of an AES-CMAC). This may be used for data such as tickets or loyalty card information, for example.

What is claimed is:

1. A method at a payment device of performing a contactless transaction with a terminal, the method comprising:
   establishing a data connection with the terminal;
   establishing if the payment device and the terminal both support an enhanced security architecture; and
   if not, performing the contactless transaction according to a basic transaction flow using a first cryptographic system; but
   if so, performing the contactless transaction according to an enhanced transaction flow using a second cryptographic system;
   wherein the first cryptographic system and the second cryptographic system comprise different asymmetric cryptographic systems.

2. The method of claim 1, wherein the first cryptographic system comprises RSA cryptography whereas the second cryptographic system comprises ECC cryptography.

3. The method of claim 1, wherein the payment device provides the terminal with a certificate for both public keys of both the first cryptographic system and the second cryptographic system asymmetric cryptographic systems.

4. The method of claim 1, wherein the second cryptographic system additionally uses AES.

5. The method of claim 4, wherein the enhanced transaction flow uses AES session keys.

6. The method of claim 5, wherein the enhanced transaction flow uses a first AES confidentiality session key for establishing a confidential channel between the payment device and the terminal and an AES integrity session key for establishing data integrity.

7. The method of claim 1, wherein in the enhanced transaction flow the payment device receives a terminal public key from the terminal, and provides a payment device public key with an encrypted blinding factor to the terminal to establish a shared secret using a blinded Diffie-Hellman key exchange.

8. The method of claim 1, wherein in the enhanced transaction flow the payment device receives a command to generate an application cryptogram for the transaction.

9. The method of claim 8, wherein the payment device provides the application cryptogram and additional transaction related data in a data envelope protected by a Message Authentication Code using an AES integrity session key.

10. The method of claim 8, wherein cardholder verification choices are received from the terminal with the command to generate the application cryptogram, and wherein the payment device provides a selected cardholder verification choice with the application cryptogram.

11. A method at a terminal of performing a contactless transaction with a payment device, the method comprising:
    establishing a data connection with the payment device;
    establishing if the payment device and the terminal both support an enhanced security architecture; and
    if not, performing the contactless transaction according to a basic transaction flow using a first cryptographic system; but
    if so, performing the contactless transaction according to an enhanced transaction flow using a second cryptographic system;
    wherein the first cryptographic system and the second cryptographic system comprise different asymmetric cryptographic systems.

12. The method of claim 11, wherein the first cryptographic system comprises RSA cryptography whereas the second cryptographic system comprises ECC cryptography.

13. The method of claim 11, wherein the second cryptographic system additionally uses AES.

14. The method of claim 13, wherein the enhanced transaction flow uses AES session keys.

15. The method of claim 14, wherein the enhanced transaction flow uses a first AES session key for establishing a confidential channel between the payment device and the terminal and a second AES session key for establishing data integrity.

16. The method of claim 11, wherein in the enhanced transaction flow the terminal provides a terminal public key to the payment device, and then receives from the payment device a payment device public key with an encrypted blinding factor to establish a shared secret using a blinded Diffie-Hellman key exchange.

17. The method of claim 11, wherein in the enhanced transaction flow the terminal commands the payment device to generate an application cryptogram for the transaction, wherein the terminal provides cardholder verification choices with the command to provide the application cryptogram, and receives from the payment device a selected cardholder verification choice with the application cryptogram.

18. A payment device adapted to perform a contactless transaction with a terminal, wherein the payment device is adapted to:
    establish a data connection with the terminal;
    establish if the payment device and the terminal both support an enhanced security architecture; and
    if not, to perform the contactless transaction according to a basic transaction flow using a first cryptographic system; but
    if so, to perform the contactless transaction according to an enhanced transaction flow using a second cryptographic system;
    wherein the first cryptographic system and the second cryptographic system comprise different asymmetric cryptographic systems.

19. The payment device of claim 18, wherein the payment device is a passive device.

20. The payment device of claim 19, wherein the payment device is a payment card.

* * * * *